2,553,559
Patented Jan. 5, 1971

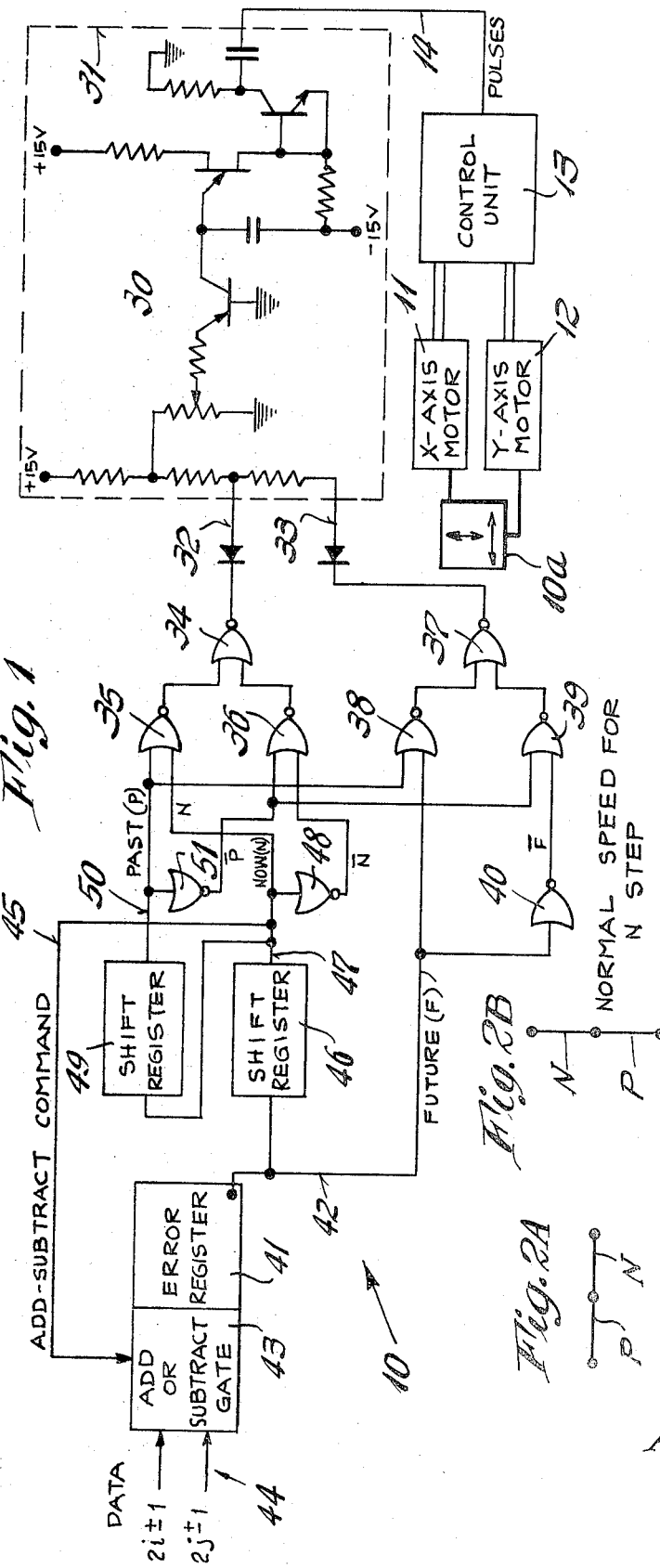
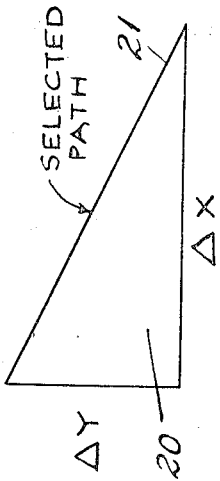

3,553,559
DIGITAL CONTOUR SYSTEM WITH RELATIVELY CONSTANT PATH SPEED
Albert C. Leenhouts, Granby, Conn., assignor to The Superior Electric Company, Bristol, Conn., a corporation of Connecticut
Filed Oct. 10, 1968, Ser. No. 766,530
Int. Cl. G05b 19/24
U.S. Cl. 318—18                                                    7 Claims

ABSTRACT OF THE DISCLOSURE

A numerical control system for causing relative movement along a path determined by coded commands by the movement consisting of constant length steps on X and Y axes with only one step occurring at a time and in which the speed of each step is selected from one of a plurality of speeds so as to maintain the speed along the path substantially constant irrespective of the direction by determining the relationship between the immediately preceding step, the present or now step and possibly the future or next step for every step that is to occur.

---

In U.S. Pat. No. 3,525,917 granted Aug. 25, 1970, filed by the present inventor and assigned to the assignee of the present invention, there is disclosed a numerical control system for effecting relative movement along a linear or arcuate path with the path being determined by the input information to the system. The information may be in the form of coded commands that are stored on media such as perforations in punched tape. The system accepts the commands and translates them into movement along two perpendicular axes, an X and Y axis with the movement consisting of constant length steps. The steps occur sequentially irrespective of the axes on which each is taken with the direction (to or fro) and the axis being selected for each step. Thus the movement consists of steps at right angles to each other rather than an absolutely linear line or arc but as the incremental movement for each step is so minute, perhaps .001" or .0005", the effect is a substantially smooth path rather than a jagged path.

While such a system has been found satisfactory, the system as therein disclosed, also had the speed or time required for each step be substantially constant as the selected axes and direction had no control over the speed. If the path of movement was exactly on an axis, either the X axis or the Y axis, then the speed of the movement along either path would be constant. However, if the path was at an angle to an axis or was an arc, the speed of movement along the path would be less than the speed along either axis with the difference depending on the angular relationship of the path and axes.

When such a system is employed with a machine tool, such as a milling machine bed moved on the X-Y axes with respect to a stationary cutting tool, the maximum speed of each step is set by both the maximum ability of the tool to function properly in cutting the material and also by the capability of the system to produce the movement. If the system does not function at its maximum speed, it does not operate as efficiently as possible, decreasing the usable time for the system. Thus when the path of movement is angular to an axis, the system's speed is less than the maximum speed which is attainable by the system, it being understood that the maximum speed occurs when the path is parallel or coincides with an axis.

It is accordingly an object of the present invention to provide a digital control system for effecting movement along a path in which the movement consists of constant length steps along perpendicular axes with the speed of the steps being adjustable to maintain a substantially constant speed along the path irrespective of the angular relationship of the path and the axes.

Another object of the present invention is to achieve the above object with a system which has a pluraltiy of speeds and in which each step has its speed determined and then selected from the plurality of speeds.

A further object of the present invention is to provide a system for effecting substantially constant speed along a path that is relatively simple in construction, reliable in use and which may be easily incorporated into a presently available digital numerical control system such as disclosed in the above-noted application.

In carrying out the present invention, the speed control system is utilized in conjunction with the numerically controlled digital contour system disclosed in the above-noted application. This system has a stepping motor for each axis mounted to effect movement along its axis with each motor upon receiving a change of energization producing an incremental step of a constant length. The changes in energization are produced substantially instantaneously by a motor control when a pulse is received by the control and thus the rate or frequency of the pulses determines the speed of the motor. In the heretofore known system, an oscillator, manually settable to one of a predetermined number of speeds, produced pulses at its essentially constant selected rate to both motors and thus the speed of both motors was constant.

The present system utilizes a variable frequency oscillator which, though capable of having many pulse rates, is herein specifically described as having three fixed rates. One rate is referred to as a normal speed rate and is the speed that the heretofore described system had which produced the maximum relative tool movement along an axis. If the normal speed rate is assigned a quantity of 1, the other speed rates of the oscillator may be any desired multiple thereof with two multiples of 1.4 and 2 being especially advantageous. Thus the other speeds are faster than the normal speed and are essentially the square root of 2 times the normal speed and double the normal speed. The use of faster speed ratios decreases the time for a step by the reciprocal of the multiple, thus the double normal speed rate produces a step in one-half the time for the normal rate while the 1.4 rate produces a step in approximately .7 times the normal speed rate.

In use, the present system is incorporated into the system disclosed in the above-noted application wherein the axis and the direction for each sequentially occurring step is determined. The present invention additionally determines for each step the rate at which the step should be taken in order to produce an essentially constant path speed. After the determination, the variable speed oscillator is caused to produce the pulse for the step at a rate selected from the three rates. For a step to occur which forms a part of the path of movement that is along an axis, the normal speed rate is employed while for a path in which the part having the step to be taken would be at a 45 degree angle to an axis, the 1.4 speed rate is employed thereby enabling two steps to be taken that have a total time essentially equal to the time required for this part of the path to be traversed at the normal speed rate. The 2 speed rate is used when the part of the path is at about a 30 degree angle to an axis. In this manner, the total time for the steps along the X and Y axes have as a sum a time required to traverse the path which is essentially within ± one or two percent, the same time as if the path were along an axis and traversed at the normal speed rate along an axis, i.e. the maximum speed.

The part of the path considered for the determination of the speed of a present step is the axis on which the present or now step is to be taken, the axis on which the past step was taken and perhaps the axis on which the next or future step is to be taken. For a relationship where the present step is on the same axis as the past step, the present step will have a normal speed rate as it indicates a path part that is along an axis. It is assumed that all steps on each axis are in the same direction on the axis and hence the axis on which the future step is to be taken is immaterial. For a path part where a past step is on one axis to be followed by a now step on the other axis which in turn is to be followed by a future step on the one axis, the 1.4 rate speed is employed. The 2 speed rate is utilized where the past step is on one axis, the now step on the other axis and the future step on the other axis. With these relationships, the relative angle of the path part to an axis that includes the now step is determinable and the speed of the now step is made to produce a time on its axis that when combined with time for other steps produces the same time as the normal speed would be on the path so that the path of movement will be traversed at a substantially constant speed irrespective of its angle to the axes.

Other features and advantages will hereinafter appear.

In the drawing:

FIG. 1 is a block and electrical schematic diagram of the speed control portion of the present invention that is incorporated into the system disclosed in the above-noted patent application.

FIGS. 2A through 2F are diagrammatic illustrations of different parts and the speed at which the path "now" (N) step is to be taken for each.

FIG. 3 is a diagram of a linear path and its coordinates for use with a herein detailed table of the speds and times at different angular paths.

Referring to the drawing, the digital control system for providing the substantially constant speed on any linear path is generally indicated by the reference numeral 10 and includes an X axis motor 11 and a Y axis motor 12. The motors are connected to a control unit 13 which accepts pulses on a lead 14. The control unit functions first to direct the pulse towards either the X axis motor or the Y axis motor and then translates the pulse into a change of energization of the stator windings of the motor towards which it was directed. With a change of energization, the motor will incrementally rotate a constant arcuate movement. The motors may be mechanically connected to a movable bed 10a, such as a milling machine bed, and the arcuate movement is translatable as by a ball nut and screw (not shown) into a linear movement or step of the bed along the axis of the moving motor.

The control unit 13 and the motors 11 and 12 form a part of a numerical control system for causing relative movement along a linear or arcuate path in response to predetermined input commands which may be coded as perforations in tape. The system accepts the information and in a manner described in the above-noted application causes pulses to occur on the lead 14 and the control unit to direct to which axis motor the pulse will become a change of energization. In a path of movement, all movements occur along the X and Y axes and each step or movement occurs sequentially so that the actual path of movement caused by the motors is a path consisting of sequentially connected steps on the X and Y axes. The system selects the axis on which a step is to be taken by determining on which axis such a step would lead toward a crossing of the desired path. For each step a determination is made.

Referring to FIGS. 2A through 2F there is shown parts of a path of movement which is produced by energization of the motors. FIG. 2A shows a path of movement where two consecutive steps are on the X axis while FIG. 2E shows a path of movement when two consecutive steps are on the Y axis. The step ocurring, the now or N step is denoted by the letter N while the past step or immediately preceding step is denoted by the letter P.

In FIGS. 2C and 2D the N step occurs on an axis which is different from the P step axis. Also there is shown a future or F step and its axis so that the F step is taken on the same axis as the P step. In FIGS. 2E and 2F the N step also occurs on an axis different from the P step but the F step will occur on the same axis as the N step. In any path of movement, even an arcuate path, which is caused to be traversed by the system in the above-noted application these are the only three possible conditions which can occur for the N step. Naturally each step in the path of movement will be a now or N step when it is taken except for the first step of the path. Thus an N step is either on the same axis as a P step or it is not. If it is not, then the F step is considered and it may be on a different axis than the N step (FIGS. 2C and 2D) or on the same axis (FIGS. 2E and 2F).

Indicated opposite each FIG. 2 is the speed at which the present system causes the N step to be taken. Thus in FIGS. 2A and 2B, the N step is taken at a normal speed or the speed at which the motors would traverse a path that coincided with an axis. In FIGS. 2C and 2D the speed of the N step is 1.4 times the normal speed requiring a time of about .7 times the speed for the normal step. FIGS. 2E and 2F indicate that the speed for the N step is twice the normal speed requiring only one-half the time for a normal speed step. By changing the speed of the step, the time for the step will be the reciprocal of the speed.

Considering FIGS. 2A and 2B, if the normal speed is taken as 1 for the N and the P step then the total time is 2 units to traverse the path having the two steps. In the path shown in FIGS. 2C and 2D, it will be appreciated that from the beginning 15 of the N step to the end 16 of the F step that the predetermined path would be a line between these two ends but that the movement of the system is along the two axes. The time for the N step is .7 while the time for the F step is also .7. This is because when the F step becomes the N step, and the N step becomes the P step, there will be a change in axis between these two steps which causes the step to be taken at 1.4 normal speed. The total time to move from end 15 to end 16 is thus the sum of .7 and .7 or 1.4 units.

The length between 15 and 16 is 1.4 times a normal length step as it is the hypotenuse of a right triangle. With the normal speed being taken at 1 for one step of a unit of time then the time to move linearly between the ends 15 and 16 at the normal speed will be 1.4 units which is the same as that for the angular movement of the N step and P step above described.

For the other condition (FIGS. 2E and 2F) where the F step is taking the same axis as the N step, then the N step will be taken at twice the normal speed or .5 time units. When the F step becomes an N step it will be taken at normal speed (the same as FIGS. 2A and 2B) and hence have a time unit of 1. The sum of the times for the two steps is 1.5 units. If in FIG. 2E the beginning of the P step is denoted 17, and the end of the F step denoted 18, the straight line distance therebetween is the $\sqrt{5}$ or about 2.2 normal length steps which would require a time of 2.2 units. The P step could be taken at either normal speed (FIGS. 2A and 2B) or at 1.4 normal speed (FIGS. 2C and 2D) and thus have a time of 1 and .7 units respectively. Thus the total time to move linearly between ends 17 and 18 may be 2.5 units (1+.5+1) or 2.2 units (.7+.5+1). As the occurrence of the former is extremely remote in view of it producing too much deviation the latter is more likely to occur which produces for the three steps a time that is essentially equal to the time required if normal steps were taken linearly between the ends 17 and 18.

The present invention does not effect an identically exact and precise speed along its path of movement as it does on an axis but they are substantially identical as shown in the following table. In FIG. 3 there is shown a triangle 20 having a leg $\Delta Y$, a leg $\Delta X$ and a hypotenuse 21 designated by a selected or total path which is the path of desired movement, with each value being in steps. The table has columns for different values of ΔX, ΔY and total path. The fourth column in the table is labeled normal speed time and is the time in units which would be required if the movement was exactly on the path at normal speed with each step requiring 1 unit of time. The fifth column is the actual time in which the present invention traverses the same path while the sixth column is the percentage error between the normal speed time and the actual time.

| ΔX | ΔY | Total path | Normal speed time | Actual time | Error (percent) |
|---|---|---|---|---|---|
| 1,000 | 0 | 1,000 | 1,000 | 1,000 | 0 |
| 1,000 | 100 | 1,005 | 1,005 | 1,020 | +1.5 |
| 1,000 | 200 | 1,020 | 1,020 | 1,040 | +2.0 |
| 1,000 | 300 | 1,044 | 1,044 | 1,060 | +1.5 |
| 1,000 | 400 | 1,077 | 1,077 | 1,080 | +0.3 |
| 1,000 | 500 | 1,118 | 1,118 | 1,100 | −0.7 |
| 1,000 | 600 | 1,166 | 1,166 | 1,160 | −0.5 |
| 1,000 | 700 | 1,221 | 1,221 | 1,220 | −0.1 |
| 1,000 | 800 | 1,281 | 1,281 | 1,280 | −0.1 |
| 1,000 | 900 | 1,345 | 1,345 | 1,350 | −0.4 |
| 1,000 | 1,000 | 1,414 | 1,414 | 1,400 | −0.1 |

It will be seen from the percent error column that while an error does exist it is of substantially minute quantity on the order of not greater than ±2%. If the speed control system of the present invention were not employed, an error magnitude of perhaps ±20% could exist.

Referring to FIG. 1, each pulse to the control unit appears on the line 14 which is the output of a variable frequency unijunction transistor oscillator 30 enclosed within the dotted line 31. The speed of the oscillator is determined by the voltage on two input leads 32 and 33. The oscillator 30 functions at a frequency to produce pulses for the normal speed rate when the lead 32 has a low voltage (is 0 in digital language); the frequency of the pulses for the 1.4 speed rate occurs when lead 32 has a high +voltage (1 in digital language and the lead 33 is low (0 in digital language) while pulses for the 2 speed rate are produced when both leads 32 and 33 are high (both 1).

The lead 32 is connected to an output of a NOR gate 34 whose inputs are connected to the outputs of NOR gates 35 and 36. The lead 33 is connected to an output of a NOR gate 37 having its inputs connected to the outputs of NOR gates 38 and 39 with the latter having its one input connected to the output of an inverter 40.

The inputs to the NOR gates are labeled P and $\bar{P}$, N and $\bar{N}$ and F denoting respectively that the past (P) step is on the X axis, the P step is on the Y axis, the now (N) step is on the X axis, the N step is on the Y axis and the future (F) step is on the X axis.

The indication of the axis of the different steps in obtained from an error register 41 (which corresponds to the error register 108 in the above-noted application) and provides through a lead 42 a binary indication of the axis on which the future step is to be taken. If the future step is to be on the X axis, the lead 42 has a high voltage (1) while if on the Y axis a low voltage (0). The error register is fully disclosed in the above-noted application and includes an add or subtract gate 43 through which data 44 is directed. The gate 43 functions in accordance with an add or subtract command on a lead 45. For each step, the error register determines the axis of the future step to be taken and will provide the indication as either a 0 or 1 on the lead 42.

Connected also to the lead 42 is a one stage shift register 46 having an output lead 47 which is connected to the N lead and also through an inverter 48 to the $\bar{N}$ lead. Another one stage shift register 49 has its input connected to the lead 47 and an output 50 connected to the P lead. Additionally, an inverter 51 provides the signal on the $\bar{P}$ lead.

It will be understood that both shift regsters 46 and 49 introduce a delay of one step. Thus a future step axis indication will appear on the F lead and also on the input of the shift register 46. After the control unit has processed the current step, the next F indication will appear on the F lead and the input of shift regster 46, wihle the previous F step indication is now the N step and appears on the lead 47 and is introduced into the shift register 49. After processing the N step, the second next F step axis indication appears on the lead 42, the first next F step indication appears on the N lead and the original F step indication appears on the P lead, the output lead 50 from the shift register 49. In the operation of the gates, assuming that the condition exists as shown in FIG. 2A wherein both P and N steps are on the X axis, the NOR gate 35 will have all 1 inputs and a 0 output while the NOR gate 36 will have two 0 inputs and a 1 output. The NOR gate 34 accordingly will have inputs of 0 and 1 producing a 0 condition on the lead 32. As to the lead 33, its state has no effect whenever the lead 32 is low.

For the condition where 1.4 normal speed occurs as shown in FIG. 2C, the leads having a 1 condition will be P, $\bar{N}$ and F which will cause the input of the NOR gate 34 to be both 0 and its output 1 while the output of the NOR gate 37 will be 0. For the situation existing in FIG. 2E where P, $\bar{N}$ and $\bar{F}$ are each 1, the outputs of both the gates 34 and 37 will be 1 causing the oscillator to function at twice its normal speed.

It will accordingly be understood that there has been disclosed a digital motor control system which is capable of effecting relative movement along an arcuate or linear path by sequentially stepping on one or other of a pair of perpendicular axis. Though the path of movement consists of angular steps, the time for traversing the path is made essentially identical to the speed along an axis irrespective of the angular relationship of the path or a part thereof to an axis. This is achieved by providing a plurality of speeds for the stepping motors and determining at which each step should be taken. The determination is controlled by the relationship of the axis on which at least the past step was taken as compared to the now step and if they differ then the axis on which the future step to be taken is considered. Thus by simple logic circuitry the frequency of an oscillator may be easily varied to control the speed of the stepping motors for each step.

Variations and modifications may be made within the scope of the claims and portions of the improvements may be used without others.

I claim:

1. In combination with a digital numerical control system for producing relative movement of a member substantially along a predetermined desired path at a substantially constant speed, said system including an X axis stepping motor and a Y axis stepping motor with each motor upon receiving a change of energization producing a step of substantially constant length along its axis, means for supplying a change of energization to one of the motors upon receipt of a pulse and means for directing each change of energization to the motor whose now step produces a movement which tends to minimize the deviation of the relative movement from the desired path by determining the axis on which each now step should be taken to effect the least deviation, the improvement comprising means for supplying pulses at any one of a plurality of rates and means for selecting one of the rates to supply the pulse for the now change of energization that produces the now step to maintain the speed of movement along the path substantially constant and with the selection being made at least for all intermediate steps.

2. The invention as defined in claim 1 in which the last-named means includes means for sensing the angular relationship of a part of the path that includes the step produced by the change of energization with respect to the two axes.

3. The invention as defined in claim 1 in which the selecting means includes means for sensing the relationship of to which axis motor to now change of energization is to be directed with respect to where an immediately past change of energization was directed.

4. The invention as defined in claim 3 in which the rates include a low rate and in which the sensing means causes the selecting means to select the low rate when the past, and the now changes of energization are directed to the same axis motor.

5. The invention as defined in claim 3 in which there is an intermediate rate and in which the sensing means also senses to which axis the next future change of energization is to be directed and causes the selecting means to select the intermediate rate when the past and future changes in energization are directed to one axis and the now change of energization is directed to the other axis.

6. The invention as defined in claim 3 in which there is a fast rate and in which the sensing means also senses to which axis the next future change of energization is to be directed and causes the selecting means to select the fast rate when the past change of energization is directed to one axis and the now and future changes of energization are directed to the other axis.

7. The invention as defined in claim 1 in which means for supplying pulses includes an adjustable frequency oscillator, having a plurality of control leads with different signals on the leads providing a different frequency, logic means for sensing the axis of the now change of energization, the axis of the immediately past change of energization and the axis of the immediately future change of energization and providing a different signal for each combination and means for applying the signal from the logic circuit to the adjustable frequency oscillator.

References Cited
UNITED STATES PATENTS

| | | | |
|---|---|---|---|
| 2,927,735 | 3/1960 | Scuitto | 318—162X |
| 3,110,865 | 11/1963 | Scuitto | 318—162X |
| 3,286,085 | 11/1966 | Rado | 318—18X |
| 3,416,056 | 12/1968 | Motooka et al. | 318—18X |

BENJAMIN DOBECK, Primary Examiner

U.S. Cl. X.R.

318—685